(12) United States Patent
Van Brocklin et al.

(10) Patent No.: US 7,729,216 B2
(45) Date of Patent: Jun. 1, 2010

(54) METHODS AND APPARATUS FOR MARKING MEDIA WITH COLLIMATED ELECTROMAGNETIC RADIATION BEAM

(75) Inventors: Andrew L. Van Brocklin, Corvallis, OR (US); Laurence M. Hubby, Jr., Palo Alto, CA (US); Daryl E. Anderson, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1365 days.

(21) Appl. No.: 11/174,700

(22) Filed: Jul. 5, 2005

(65) Prior Publication Data

US 2007/0008859 A1 Jan. 11, 2007

(51) Int. Cl.
*G11B 7/00* (2006.01)

(52) U.S. Cl. .................. 369/47.1; 369/100; 369/53.1; 347/253

(58) Field of Classification Search .............. None
See application file for complete search history.

(56) References Cited

U.S. PATENT DOCUMENTS

| | | | |
|---|---|---|---|
| 4,948,233 A | 8/1990 | Maruyama | |
| 5,134,602 A | 7/1992 | Baca et al. | |
| 5,216,659 A | 6/1993 | Call et al. | |
| 5,631,887 A | 5/1997 | Hurst, Jr. | |
| 5,640,381 A | 6/1997 | Call et al. | |
| 5,978,335 A | 11/1999 | Clark et al. | |
| 6,225,595 B1 | 5/2001 | Wei et al. | |
| 6,246,660 B1 | 6/2001 | Yanagawa | |
| 6,483,666 B2 | 11/2002 | Wei et al. | |
| 6,639,177 B2 | 10/2003 | Ehrmann et al. | |
| 6,862,033 B2 * | 3/2005 | McClellan | 347/224 |
| 2002/0118614 A1 | 8/2002 | Watt et al. | |
| 2002/0122359 A1 | 9/2002 | Yoshida | |
| 2002/0141313 A1 | 10/2002 | Chuang | |
| 2002/0141473 A1 | 10/2002 | Cordingley et al. | |
| 2003/0099177 A1 | 5/2003 | Wang et al. | |
| 2003/0108708 A1 | 6/2003 | Anderson et al. | |
| 2003/0161224 A1 | 8/2003 | Anderson et al. | |
| 2004/0090896 A1 | 5/2004 | Chuang | |
| 2004/0114472 A1 | 6/2004 | Wang et al. | |
| 2004/0125836 A1 | 7/2004 | Lai et al. | |

\* cited by examiner

*Primary Examiner*—Muhammad N. Edun (57) ABSTRACT

A method is provided for recording visible marks on a recording medium using an input beam generated by an electromagnetic radiation source. The method comprises (a) substantially collimating the input beam to provide a substantially collimated beam, and (b) applying the substantially collimated beam to the recording medium to provide the visible mark on the recording medium.

38 Claims, 9 Drawing Sheets

METHODS AND APPARATUS FOR MARKING MEDIA WITH COLLIMATED ELECTROMAGNETIC RADIATION BEAM

BACKGROUND

Low power lasers are employed to read and write binary data on a data region of media. One typical media are optical storage discs, such as CDs, DVDs and the like. Typically, various types of data are written on a data side of the disc by a laser beam while the disc is rotating. Data may be recorded by changing a property of a desired area on the recording media so that the area is indicative of a zero or one data value.

The side of a data disc opposite the data side is often used as a label region for handwriting or affixing or marking a label with descriptions and illustrations corresponding to the recorded data. Recently, apparatus and methods have been developed with the ability to generate an optically visible label on the label region of an optical disc using the same laser that was employed to read and write digital or electronic data on the data side of the disc. See U.S. Patent Application Publication No. 2003/0108708 (Anderson, et al.), disclosing the use of laser sensitive materials on a disc label that react chemically with the application of light and heat and result in changes in color and shading on the label. As used herein, the terms "spot" or "data spot" refers to a non-visible spot or mark made on the data region of the media. The terms "mark" or "visible mark" refers to visible mark or spot made on the label region of the media.

In making data spots using an optical disc drive, small spots are produced extremely closely together, in order to pack as much data as possible onto the disc. Typically data spots are only about 1.7 micron in diameter or less. Thus, it is important to provide precisely focused data beams that are positioned exactly on the appointed data track. Another reason for having a focused beam for data writing is that a protective surface layer and/or defects and dust are commonly part of the data surface of a medium. Hence, a focused beam is needed for data writing to allow the beam to focus on the active layer. Likewise, in reading data spots, the read beam must be precisely focused and tracked to obtain correct data. This data read/write process requires precise and expensive optics and tracking elements in the data marking and optical pickup unit (OPU) devices of a laser/optical disc system, adding substantially to the cost of such systems.

In addition, it is important that data spots be small enough to enable suitable data storage density. Accordingly, it is desirable that a spot on the optical disc surface be made as small as possible to ensure accurate writing and reading. Numerical Aperture (NA) and wavelength of the electromagnetic radiation determine the minimum data spot size that can be marked on an optical data storage media. The smallest data spot size is created by using the highest practicable NA for the objective lens, that is the lens that focuses the laser light onto the media. For data systems, the entrance NA of an optical data system next to the data writing laser, referred to as the entrance pupil, has typically been small (less than 0.10). This small NA is chosen to make the irradiance distribution on the back of the objective lens as even as possible. The exit NA of the optical data system next to the recording surface, called the exit pupil, has typically been relatively large (more than 0.45), so that the data spot can be very small when focused. The small NA of the entrance pupil results in a substantial loss of laser power, as most of the light does not pass through the optical system. Existing OPUs are about 37% efficient from the laser diode output to the data spot. In addition, the large exit NA of an optical data system provides a short range of working distance within which the spot is in focus, thereby causing narrow tolerances in the variation of allowable distances between the optics and recording media.

SUMMARY OF THE INVENTION

A method of the present invention provides for recording an image on a recording medium using an input beam coupled to an electromagnetic radiation source to provide a visible mark on the recording medium. The method comprises (a) substantially collimating the input beam to provide a substantially collimated beam, and (b) applying the substantially collimated beam to the recording medium to provide the visible mark on the recording medium.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In one aspect of the present invention, a laser is used for producing visible marks providing images on a label region of a recording medium. In one embodiment, the recording medium is an optical disc and the markings are formed on a label side of the optical disc opposite to a data side of the disc. The marks may be constructed in such a way as to form text, graphics, or images that are visible to human observers. The marks are provided by a substantially collimated beam that is not focused or tracked on the optical disc label recording surface. Accordingly, the focusing and tracking devices normally in a data write/read laser system may be eliminated. In addition, the optic system of the present invention utilizes a relatively large NA for the entrance pupil to the optics system, in order to capture as much energy as possible from the source of electromagnetic radiation.

Thus, the entrance pupil NA is large relative to an optical data system. As used herein, the term "large entrance pupil NA" shall mean an NA of 0.1 or more for the entrance pupil. The NA of the exit pupil from the optics system of the present invention may be relatively small compared to an optical data system, since large Rayleigh range is desired, rather than a small mark size. By having a small exit pupil NA, the beam becomes substantially collimated and the range of acceptable working distance is very long, so that no focusing apparatus is needed. As used herein, the term "small exit pupil NA" means an NA of 0.04 or less for the exit pupil. An acceptable range of beam diameter for our application is defined as a range in which the beam area at half maximum irradiance increases from a point of minimum diameter, called the beam waist, to a point where the area of the beam is no more than double. This acceptable range is referred to as the Rayleigh range.

Accordingly, the present invention eliminates the need for focusing and tracking devices in the OPU, which in turn substantially reduces the cost and power consumption of the optical laser system. Typically, the working distance range for the collimated system is larger than the distance variation between the media and the optics. Thus, there is no need for focusing since the media will always be within the working distance range of the collimated beam writing system.

It should be understood that diffraction causes a light wave to spread transversely as it propagates, so it is impossible to have a perfectly collimated beam. For purposes of the present invention, a beam will be considered to be substantially collimated when a beam emanating from the optics has an exit pupil NA of 0.04 or less.

In the present invention, since the NA of the entrance pupil is substantially larger than in comparable data systems, the power efficiency may increase substantially, to as high as 95%. A beam waist diameter of 34 microns full-width, half-max (FW M) is obtained in at least the embodiment shown in FIG. 5. Full width refers to the beam diameter and half-max means half of the maximum beam power. In the present invention, the Rayleigh range may be about 1 mm. Typically, the desired size of a mark for label marking may be around 30 to 50 microns in diameter, with the smallest desired size being about 10 microns. This mark diameter is much larger than the width of a data spot, which is typically less than 1.7 microns.

As discussed above, the present invention provides a label printer without many of the components that are typically used in a data printer system. The focus and tracking devices, and related controls are eliminated. The quad sensor may be replaced by a simple sensor device. A beam splitter, associated front monitor and sum sensor may not be needed in some cases. Accordingly, a separate label printer system may be implemented according to the present invention. Alternately, a secondary optical path may be employed to implement this label printer system in an optical disc drive, mounted parallel to the OPU (optical pickup unit) that is part of the data read/write system.

Laser System

Figure 1:
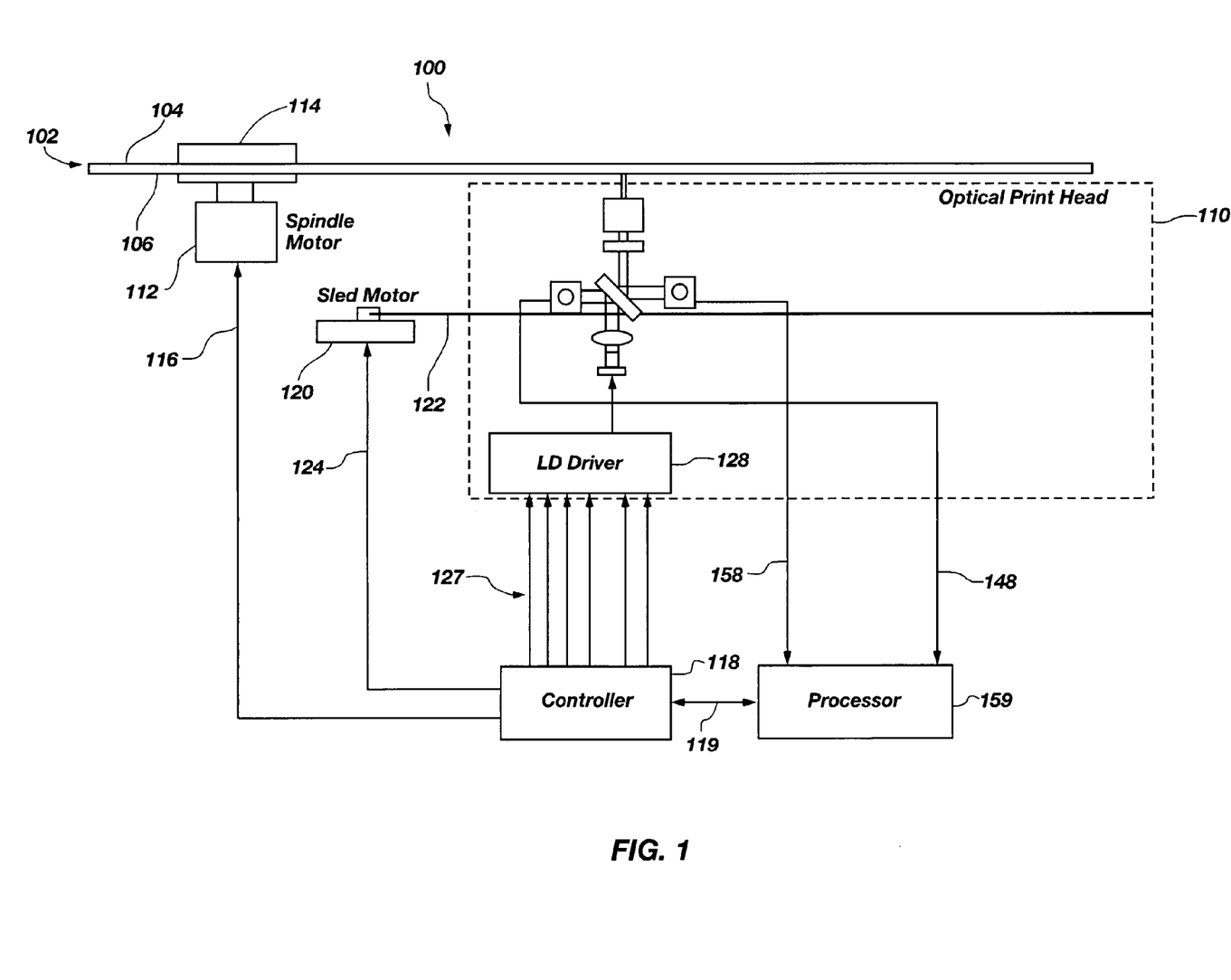
FIG. 1 is a schematic diagram of a laser writing and detection system according to an embodiment of the present invention.
Figure 2:
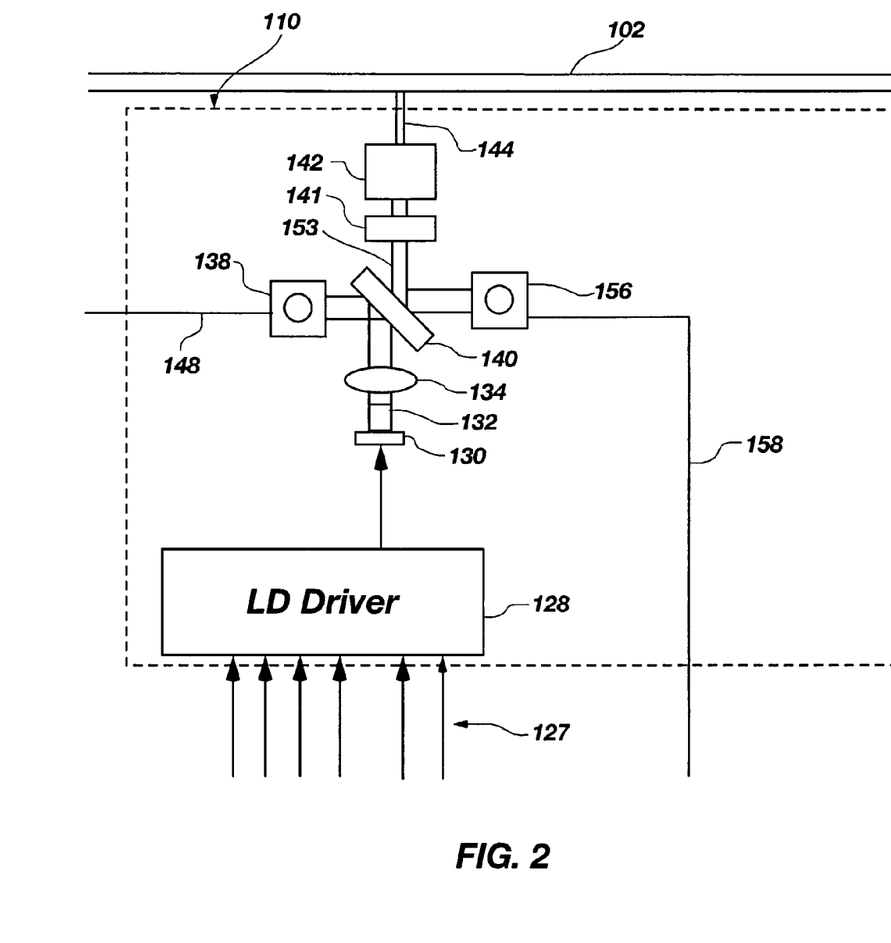
FIG. 2 is a partial schematic view of the diagram shown in FIG. 1.

FIGS. 1 and 2 show a label writing system 100 according to an embodiment of the invention, in which a laser 130 is used for reading from and/or writing label markings on an optical disc 102. More specifically, a conventional data storage device is used for reading and/or writing to an optically writable data side 104 of the optical disc 102. Before or after the data writing operation is performed, the optical disc may be turned over so that the label side 106 of optical disc may be written upon, for the purpose of labeling and otherwise marking the optical disc 102. At this point, the label writing system 100 is employed. An optical print head unit (OPU) 110 provides the energy beam, lenses and other devices necessary to provide energy beams for reading and writing on the medium, as explained below.

The label system 100 includes a spindle motor 112 and a spindle 114 for rotating the optical disc 102. Specifically, the optical disc 102 is situated on the spindle 114, which is rotated or moved by the spindle motor 112 to a position specified by an input control signal 116. A controller 118 provides control signal 116 to the spindle motor 112, and may be comprised of control hardware and/or software.

The storage device 100 further includes a sled motor 120 and a sled rail 122 for moving a sled (not shown) that supports the OPU 110. Specifically, the OPU 110 is situated on the sled that is moved on the sled rail 122 by the sled motor 120 to a given position specified by a sled control signal 124 coming from controller 118.

The OPU 110 writes and reads label data on label side 106 of optical disc 102. In one embodiment, the optical disc 102 is rotated by spindle 114 as the label data is written on optical disc 102. The sled causes the OPU 110 to move radially, so that the label data is written in radial increments that may or may not constitute tracks on optical disc 102. The manner of moving the spindle 114 and sled to cause the OPU 110 to write label data is not a part of this invention and may vary in different applications of the invention. Examples of this label writing operation are given in copending U.S. patent application Ser. No. 10/898,392, filed Jul. 23, 2004, entitled "Track Labeling On a Medium," and copending U.S. patent application Ser. No. 10/867,436, filed Jun. 14, 2004, entitled "Detecting Radius Of Optically Writable Label Side of Optical Disc At Which Markings Have Not Been Written."

Again referring to FIG. 1, controller 118 generates laser control signals 127 to a laser diode driver 128 to drive the OPU 110. No tracking or focusing devices are needed, nor are any related controlling components needed, so the OPU 110 is substantially more simple than prior devices.

Looking at FIG. 2, the OPU 110 is shown in greater detail. Laser 130 is disposed to generate a laser beam 132 that is directed to lens 134, changing the diverging beam to a substantially collimated beam. The beam 132 then passes to a polarizing beam splitter 140. Most of the energy passes through the beam splitter. However, the remainder of beam 132 reflects off of beam splitter 140 to a front sense diode 138 that senses the strength of beam 132 and provides a signal 148 to processor 159. After passing through polarizing beam splitter 140, beam 132 is directed through a quarter wave plate 141 and a lens unit 142 to write on label surface 106 of optical disc 102.

The quarter wave plate 141 takes linearly polarized light from the laser (P polarized) and changes it into circularly polarized light. The circularly polarized light is reflected from the disc 102 and is changed back into linearly polarized light (S polarized) by the quarter wave plate 141. The resulting light is at 90 degrees polarization to the original light from the laser. This allows the returned S polarized light to be reflected by the polarizing beam splitter 140. The quarter wave plate 141 is required for the beam splitter 140 to operate.

In one embodiment of a label marking or "writing" operation, the write laser 130 may be an infrared diode laser emitting a light beam having a wavelength of about 780 nanometers, in order to effectively interact with chemicals on the medium and cause image marking to take place. A thermochromic marking system may be commonly used. This system uses a media containing a chemical system that induces a permanent or temporary change in the appearance of the media after the media is heated to a certain critical temperature. For one embodiment, the critical temperature is 170 degrees C. A photochromic marking system may also be used. This system uses a media containing a chemical system that induces a permanent or temporary change in the appearance of the media after the media is exposed to light shorter than certain wavelengths.

The laser diode driver 128 may utilize a digitally enabled current source set to a selected current value by an external resistor. The front monitor photo-detector 138 provides an output signal 148 to the processor 159. Processor 159 is in two-way communication with controller 118 via link 119 to provide feedback for adjustments to the drivers as needed. Processor 159 may cause the controller 118 to generate control signals 127 to the laser diode driver 128, to thereby adjust the power level of laser 130.

During marking detection or "read" operation, laser 130 again generates beam 132 that passes through lens 134, acting to change the beam 132 to a substantially collimated beam. Beam 132 typically has a lower power during a read operation than during a write operation, so as to not generate any extraneous markings on the recording medium. Beam 132 passes through beam splitter 140, quarter wave plate 141 and beam sizing unit 142 to impinge upon the image written earlier on label surface 106 by beam 132. The reflected beam from the label surface 106 of optical disc 102 passes back through beam sizing unit 142 and quarter wave plate 141 to polarizing beam splitter 140. Most of the reflected beam 153 is reflected to be intercepted by a single photo-detector 156. A SUM signal 158 is generated by photo-detector 156 and sent to a processor 159, shown in FIG. 1. This SUM signal corresponds to the reflected light from the optical disc surface 106. This returned light is used to read various features on the disk, including factory made features, such as the media identification describing the media type, or the marks made on the media by the OPU 110

Lens Structure for Collimated Beam Systems

Figure 3:
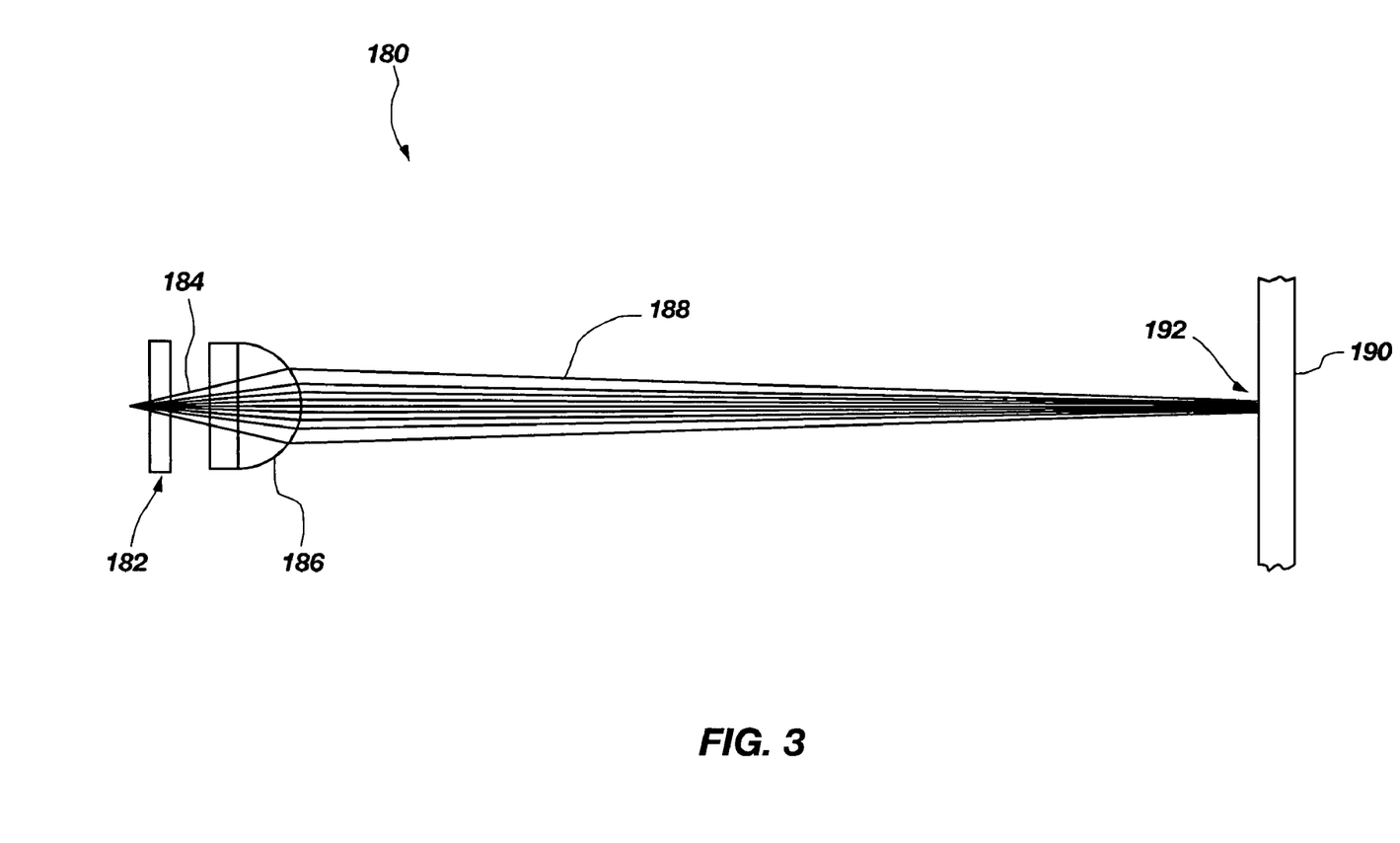
FIG. 3 is a schematic diagram of an optical lens system used in connection with one embodiment of the present invention.

Referring first to FIG. 3, a single lens system 180 is shown, in which a single lens is used to couple energy from a laser to a recording medium with a substantially collimated beam. In the system shown in FIG. 3, a SUM sensor is not needed. A monitor in the laser case can be used to sense laser power, and the media can be identified during the data writing process. Thus, there is no need for a SUM sensor to observe reflected light from the media. Accordingly, a single lens can be used to couple electromagnetic energy from the laser to the media.

Laser unit 182 provides a diverging input beam 184, that may have a variety of different shapes, including elliptical and round. An input/output lens 186 may be a aspheric lens having an entrance pupil NA of about 0.24 and an exit pupil NA of about 0.025. The lens 186 has a planar input front face, with an aspheric output rear face that is symmetric about the axis of propagation. The lens thickness is 1.1 mm, the rear face sag is defined by a radius of −0.749621 mm, a 2nd order term of 0.004714038 mm, a $4^{th}$ order term of 0.184133 mm, and a $6^{th}$ order term of 0.294150 mm. Accordingly, lens 186 captures a large part of the energy from the laser unit 182 and provides a substantially collimated output beam 188 to produce a mark 192 on recording medium surface 190 without any focusing or tracking devices.

Figure 4:
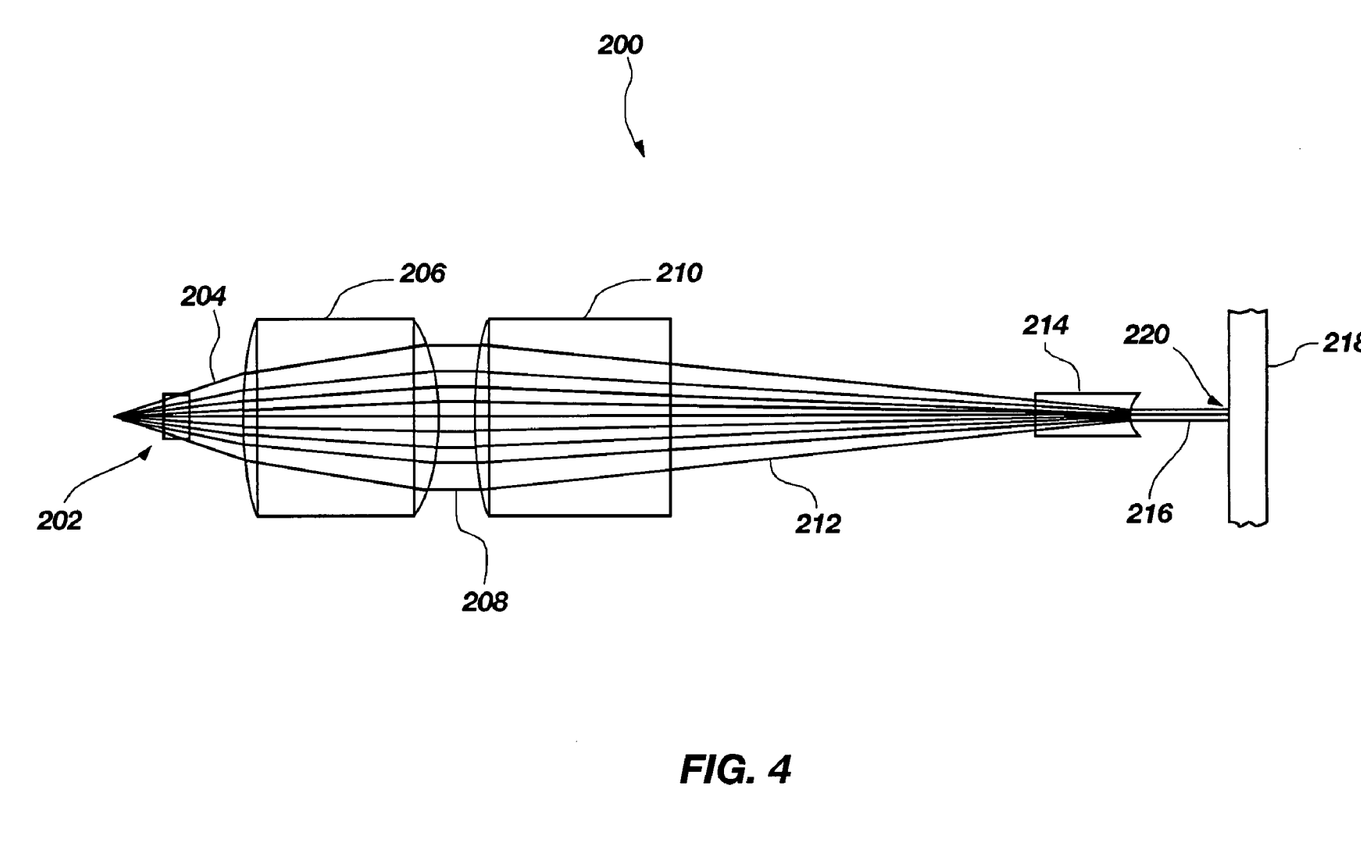
FIG. 4 is a schematic diagram of an optical lens system used in connection with another embodiment of the present invention.

Looking now at FIG. 4, a lens system 200 is shown for generating a collimated beam, utilizing three lenses. A laser unit 202, consisting of a laser diode and laser window, provides a diverging input light beam 204 that is collimated by input lens 206. The collimated beam 208 is directed to a first lens 210 that provides a converging beam 212 to a second collimating output lens 214. The resulting smaller collimated output beam 216 is directed to the recording medium 218 to provide an image 220. Lenses 210 and 214 form a beam sizing unit that may be the same or similar to beam sizing unit 142 in FIG. 2. Lens 210 has a relatively large entrance pupil NA of about 0.23 and lens 214 has a relatively small exit pupil NA of about 0.02.

In one embodiment, the laser unit 202 provides a diverging input beam 204, that may have a variety of shapes, including elliptical or round. Lens 206 can be model 350150 available from Geltech, Inc. Lenses 210 and 214 may be aspheric lenses. The distance from the laser diode window 202 to the first collimating lens 206 may be about 0.524514 mm, and the collimated beam 208 may have a radius of 0.524 mm in the Y axis, with radius conventionally specified at 13.5% of the peak laser irradiance. Lens 210 may have a convex front with a radius of 2.910360 mm, a $2^{nd}$ order term of 1.349413E-3 mm, a $4^{th}$ order term of −7.145999E-3 mm, and a $6^{th}$ order term of −2.270751E-3 mm, a thickness of 2 mm and a planar rear face. Lens 214 may have a front defined by a radius of 0 mm, a $2^{nd}$ order term of 0.111351 mm, a $4^{th}$ order term of 2.456826 mm, a $6^{th}$ order term of −59.567818 mm, and a concave rear face with a radius of −0.3200 mm, and a thickness of 1 mm. There is 3.720 mm spacing between lens 210 and 214.

The smaller collimated output beam 216 may have a waist of 32 microns in diameter at 50% of peak irradiance. These optics are capable of forming a printed image of about 400 dots per inch or better. Of course, other variables, such as linear velocity of the disc, thermal spreading and media sensitivity will affect the size of the mark formed on the media. The working distance of recording medium 218 from lens 214 can be from 2.8 mm to about 4.2 mm.

Figure 5:
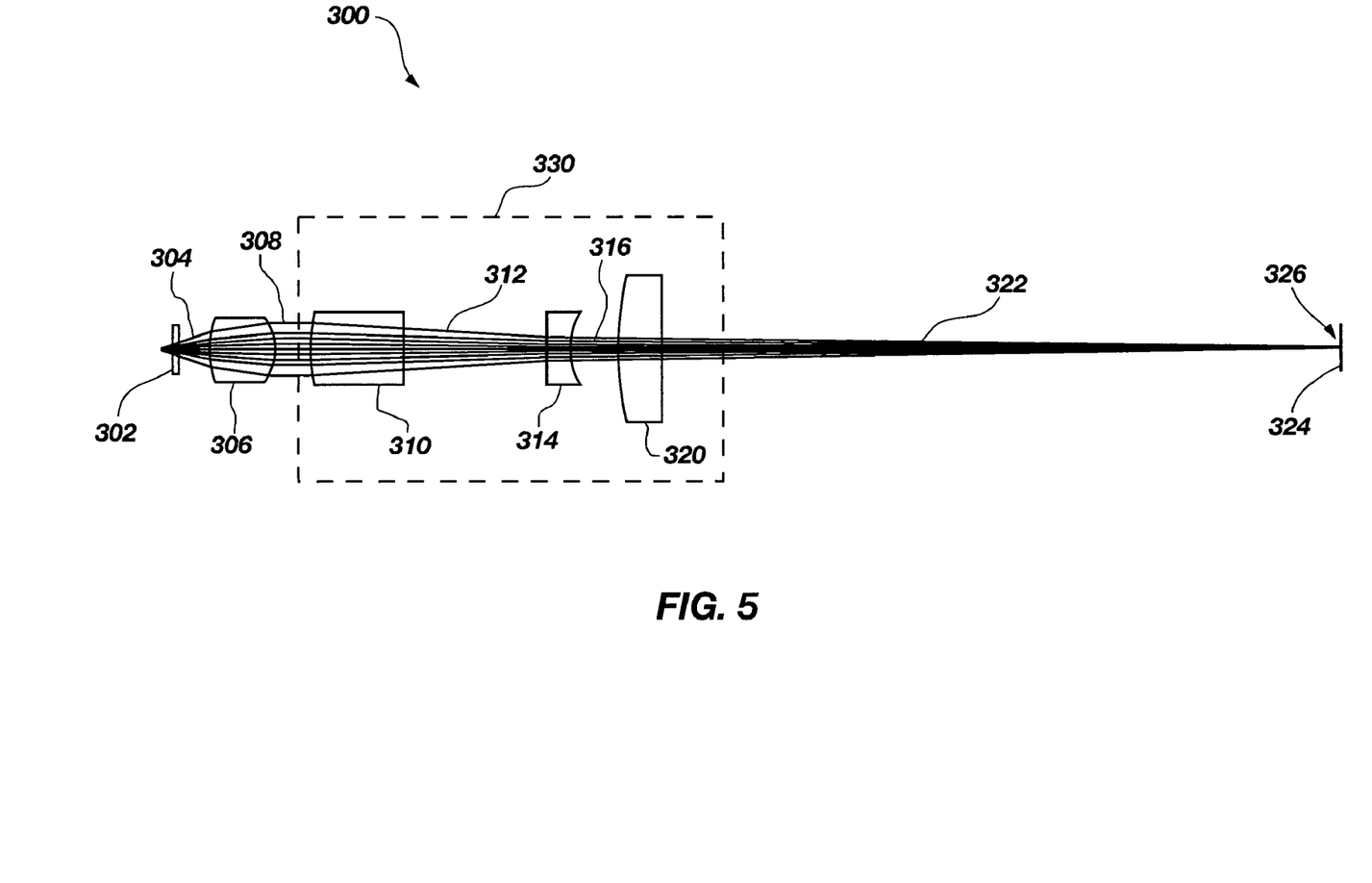
FIG. 5 is a schematic diagram of another optical lens system used in connection with another embodiment of the present invention.

Referring now to FIG. 5, a lens system 300 is shown for the collimated beam arrangement of the present invention, utilizing four lenses to provide a circular spot. A laser unit 302, the same or similar to laser unit 130 and laser 202, generates a diverging input light beam 304 that is directed to a collimating input lens 306, the same or similar to lens 134 in FIG. 2. A substantially collimated beam 308 then proceeds to a beam sizing unit 330, that may be the same as or similar to beam sizing unit 142 in FIG. 2.

Beam sizing unit 330 includes a converging lens 310 that provides a converging beam 312 that is directed to a diverging lens 314 generating a substantially collimated beam 316.

At this point, the beam 316 is substantially collimated and could be directed to the recording medium 324 of an optical disc. However, as stated above, diffraction causes a light wave to spread transversely as it propagates, so it is impossible to have a perfectly collimated beam. Since beam 316 may be slightly diverging, an object output lens 320 is provided to output a slightly converging output beam 322, that is shaped to provide a mark 326 of desired size on recording medium 324.

In one embodiment, the laser unit 302 may consist of a near IR laser emitting a beam with a nominal wavelength of 780 run, such as the Sharp GH07 series. Collimating lens 306 may be a Phillips lens, model CAY033, providing an entrance pupil NA of 0.45. Lenses 310 and 314 are cylindrical lenses forming an anamorphic telescope, designed to correct astigmatism and make the beam circular. Thorlabs LJ1636 and Thorlabs LK1087 can be used for lenses 310 and 314, respectively. Output lens 320 is designed to create the mark 326 having a diameter of about 30 microns at laser intensity of about 50% and a Rayleigh range of about 1.0 mm. Thorlabs LA1700 can be used for lens 320.

The lens system shown in FIG. 5 may be typically used in a typical height optical disc drive with only about a plus or minus 500 micron variability in media to optical pickup distance, so the Rayleigh range and the distance variability are compatible. This lens design enables the recording medium to be spaced much farther away than the embodiment shown in FIG. 4. In the FIG. 5 embodiment, the working distance may be about 27 mm from the output lens 320 to the recording medium 324. This distance may exceed the practical working distance because of space limitations, in which case one or more folding mirrors may be applied.

Figure 6:
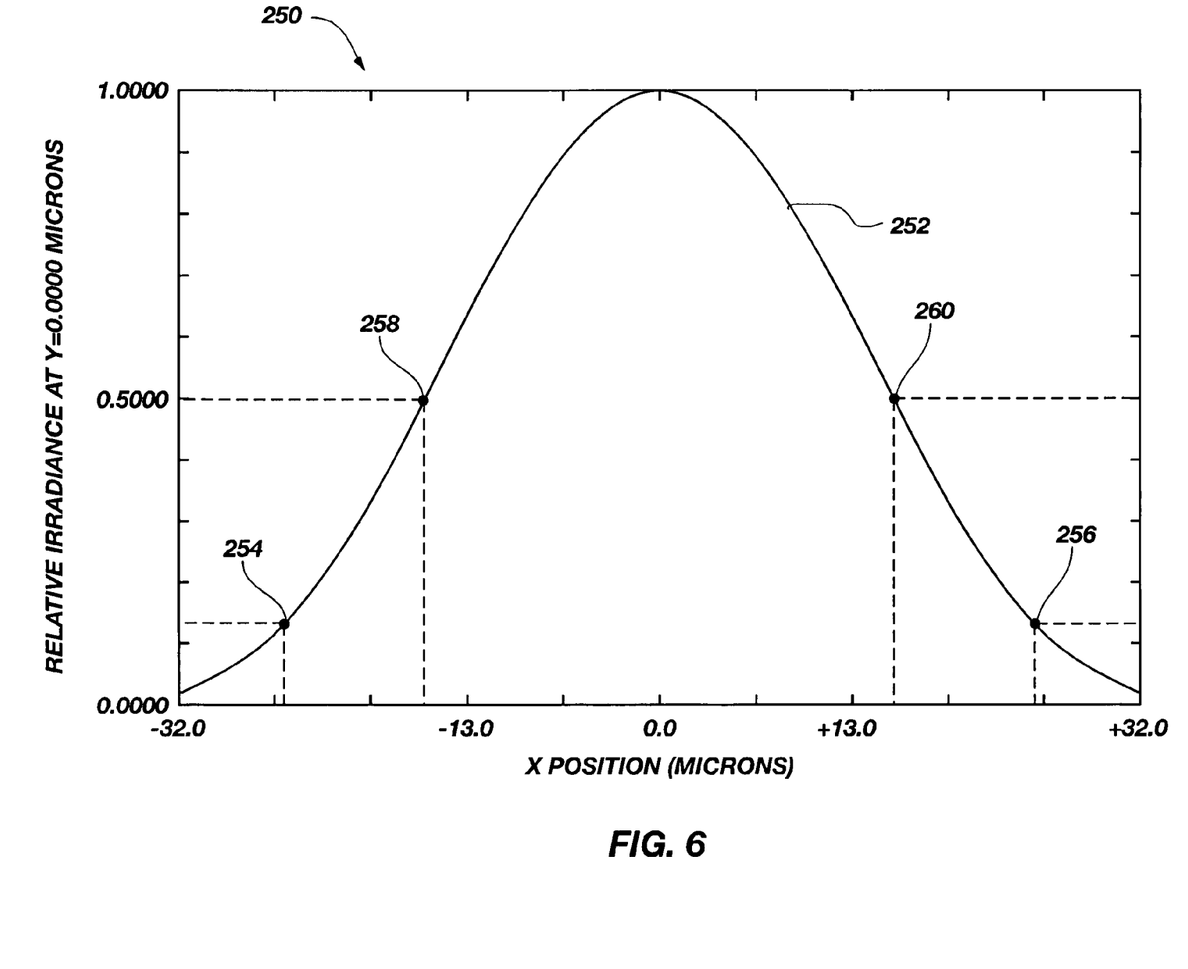
FIG. 6 is a graph of the irradiance versus media location of a laser beam according to an embodiment of the present invention.

Referring now to FIG. 6, the point spread function or PSF is shown for the optics system in FIG. 5. In standard form, the beam emitted from a laser begins as a Gaussian (bell-shaped) transverse irradiance profile. The Gaussian shape is truncated at some diameter either by the internal dimensions of the laser or by a limiting aperture in the optical train. The commonly adopted diameter of a laser beam is defined as the diameter at which the beam irradiance (intensity) has fallen to about 13.5% of its peak value. In FIG. 6, the 13.5% points 254 and 256 occur at an X position of about −25 microns and +25 microns, respectively. In optical labeling systems, however, the 50% point may be used to denote the beam diameter. Thus, points 258 and 260 are the 50% irradiance points, which correspond with an X position of plus and minus about 16 microns, resulting in a FWHM beam diameter of about 32 microns.

Figure 7A:
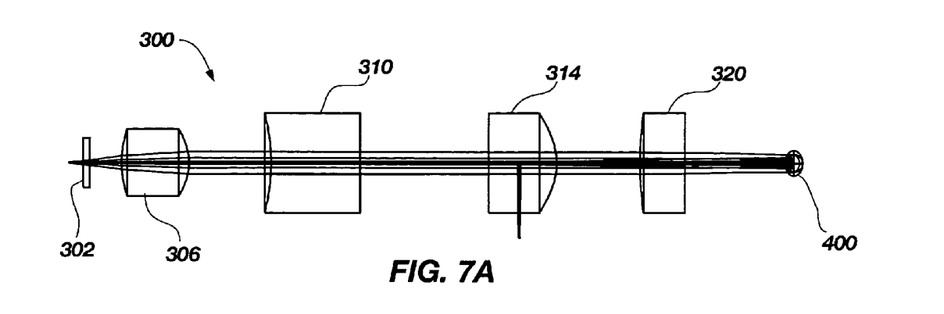
FIG. 7A-7C are schematic diagrams of an optical lens system with mirrors, used in connection with another embodiment of the present invention.
Figure 7B:
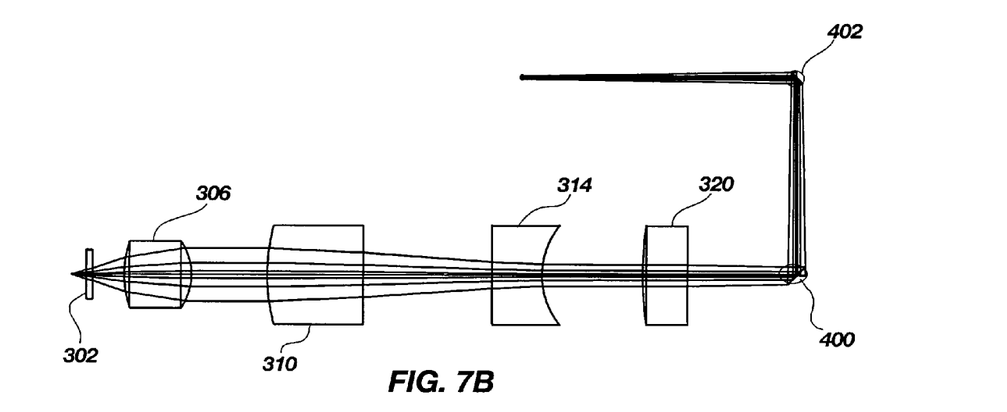
Figure 7C:
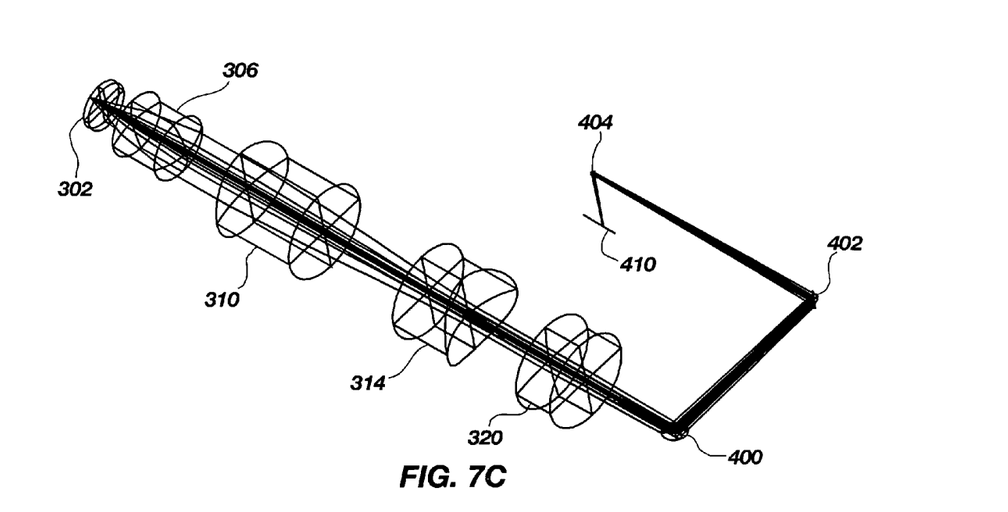

Referring now to FIGS. 7A-C, a system of folding mirrors is shown that may be used in conjunction with the optics system of FIG. 6, in order to achieve the small beam waist and large Rayleigh range, while working with the space limitations of the system. FIGS. 7A-C show system 300 with laser unit 302 and lenses 306, 310, 314 and 320, just as illustrated in FIG. 6. FIG. 7A shows a 90-degree view, relative to the beam axis, FIG. 7B shows a 0-degree view relative to the beam axis and FIG. 7C shows an isometric view of the beam. As best seen in FIG. 7C the beam is reflected by three mirrors 400, 402 and 404, each at 90 degrees, and each on a different axis, to eventually impact a work piece 410, such as a recording medium.

Looking at FIGS. 7A and 7B, it can be seen that lenses 310 and 314 are not symmetric about the axis of beam propagation. Lens 310 is a plano-convex cylindrical lens, and lens 314 is a plano-concave cylindrical lens. The two lenses function together as a telescope, reducing the waist beam size of the light beam on one axis and thereby changing the elliptical beam emitted from laser unit 302 to a circular beam. Lens 320 is a plano-convex spherical lens that is symmetric about the axis of beam propagation, and causes the beam, which is has the desired circular shape, to be reduced in waist size to the necessary diameter on work piece 410.

Figure 8:
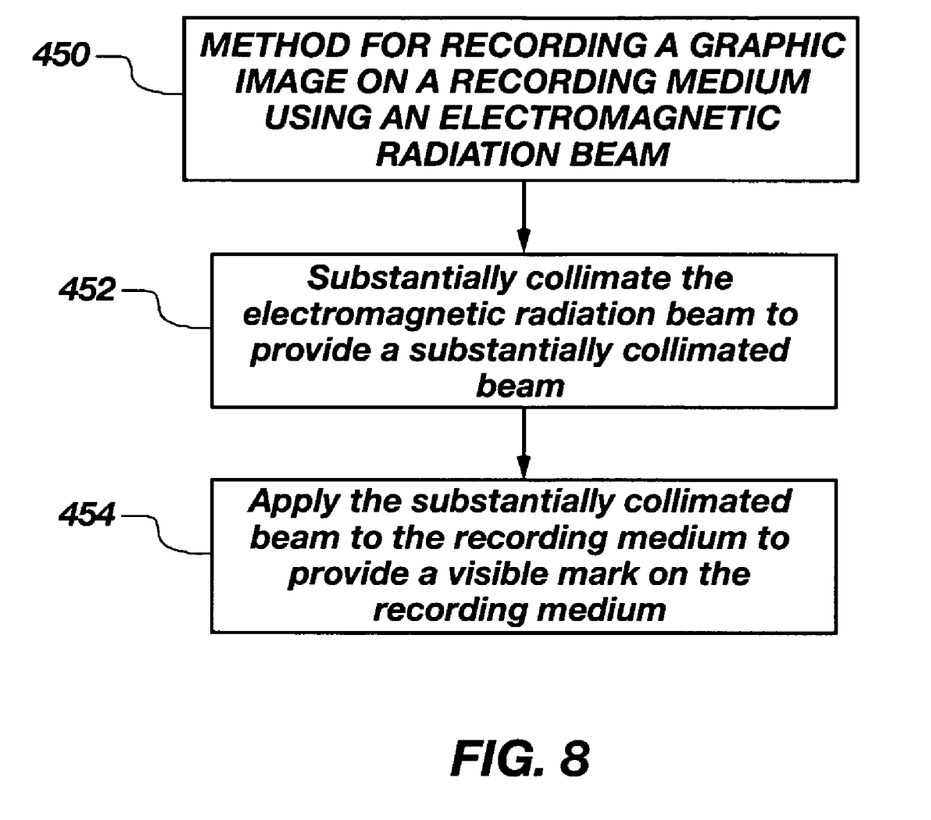
FIG. 8 is a flow diagram of a method of recording visible marks on a recording medium according to an embodiment of the present invention and FIG. 9 is a flow diagram of another method of recording visible marks on a recording medium according to another embodiment of the present invention.

Looking at FIG. 8, a method 450 is shown for recording an image on a recording medium using an electromagnetic radiation beam, such as a laser beam, according to the optics system 180 shown in FIG. 3. At step 452, the electromagnetic radiation beam is substantially collimated to provide a substantially collimated beam. At step 454, the substantially collimated beam is applied to the recording medium to provide a visible mark on the recording medium.

Figure 9:
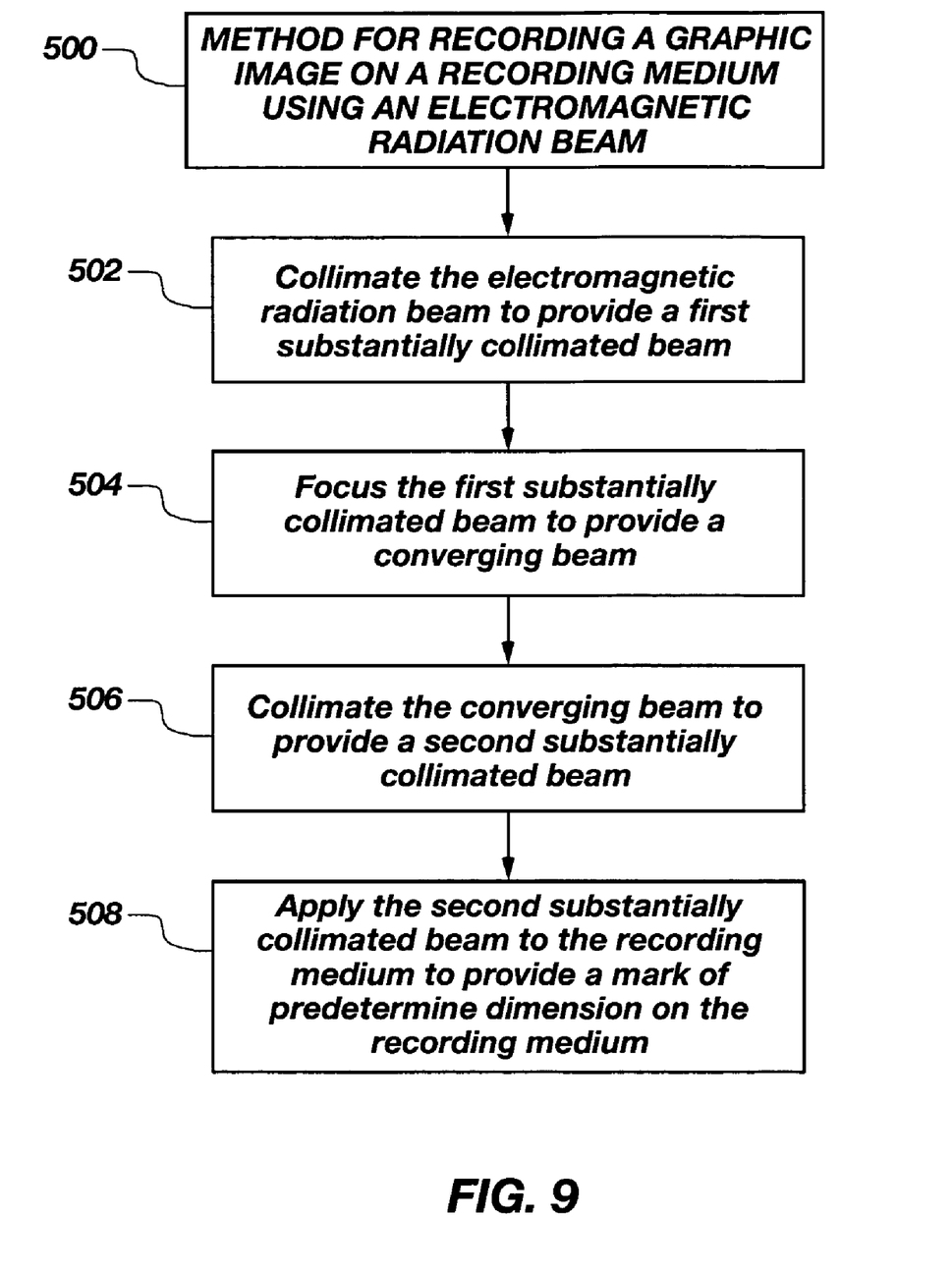

Referring now to FIG. 9, a method 500 is shown for recording a graphic image on a recording medium using an electromagnetic radiation beam, such as a laser beam, according to the optics systems 200 and 300 shown in FIGS. 4 and 5, respectively. At step 502, the electromagnetic radiation beam is substantially collimated to form a first substantially collimated electromagnetic radiation beam. Next at step 504, the collimated beam is focused to provide a converging beam directed toward a convergence point. Next, at step 506, the converging beam is substantially collimated to provide a second substantially collimated beam. Finally, at step 508, the second substantially collimated beam is directed to an optical recording surface to make a mark of pre-selected dimensions.

In one embodiment of the present invention, the recording medium may comprise a label region configured for recording a human-visible image. The label region may be disposed on a recording medium such as an optical disc, for example on a label side opposite to a data side having human-nonvisible data, such as binary data, recorded thereon. The optical disc may be a digital versatile disc (DVD), high-definition digital versatile disc (HD DVD), compact disc (CD) or Blu-Ray optical disc or other similar type of medium. The recording medium may comprise a substrate, which may be plastic, paper, or a thin material like paper (referred to as "paper-like") or other material. The label region, in some embodiments, may be disposed on, attached to, or formed integrally with the substrate. The label region may comprise materials that visibly respond to the application of electromagnetic radiation in a thermochromic, photochromic or other manner. The output power level of a substantially collimated beam according to one embodiment of the present invention may be less than 450 mW for a write operation.

It should be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A method for recording visible marks on a recording medium using an input beam generated by an electromagnetic radiation source, comprising:
    (a) coupling the input beam to an input lens having an entrance numeric aperture of 0.1 or more;
    (b) substantially collimating the input beam using an output lens having an exit numeric aperture of 0.04 or less to provide a substantially collimated beam; and
    (c) applying the substantially collimated beam to the recording medium to provide the visible marks.

2. The method of claim 1, wherein the input lens is integral with the output lens.

3. The method of claim 1, wherein the coupling comprises substantially collimating an electromagnetic radiation beam from the electromagnetic source to provide a preliminary substantially collimated beam, and converging the preliminary substantially collimated beam to provide the input beam.

4. The method of claim 1, wherein the visible marks are produced by a thermochromic system.

5. The method of claim 1, wherein the visible marks are recorded on a label region of the recording medium different from a data region of the recording medium.

6. The method of claim 5, wherein the recording medium is an optical disc, the label region is on one side of the optical disc and the data region is on the opposite side of the optical disc.

7. The method of claim 6, wherein the optical disc is a DVD, HD DVD, CD or Blu-Ray optical disc.

8. The method of claim 1, wherein the electromagnetic radiation source is a laser.

9. The method of claim 1, wherein the recording medium comprises a label configured for recording a human-visible image.

10. A method for recording visible marks on a recording medium using an input beam generated by an electromagnetic radiation source, comprising:
  (a) substantially collimating the input beam to provide a substantially collimated beam; and
  (b) applying the substantially collimated beam to the recording medium to provide the visible mark on the recording medium.

11. The method of claim 10, wherein the substantially collimating the input beam comprises substantially collimating an electromagnetic radiation beam from the electromagnetic radiation source to provide a preliminary substantially collimated beam, and converging the preliminary substantially collimated beam to provide the input beam.

12. The method of claim 10, wherein the substantially collimated beam is formed by a lens having an exit pupil with a numeric aperture of 0.04 or less.

13. The method of claim 10, wherein the substantially collimated beam is formed by a lens having an entrance pupil with a numeric aperture of 0.1 or greater.

14. The method of claim 10, wherein the substantially collimated beam has an output Rayleigh range greater than 100 microns.

15. The method of claim 10, wherein a beam waist of the substantially collimated beam is in the range of 8 to 35 microns, full width half max.

16. The method of claim 10, wherein the visible marks are produced in a thermochromic manner.

17. The method of claim 10, wherein the visible marks are produced in a photochromic manner.

18. The method of claim 10, wherein the input beam is generated by a laser.

19. The method of claim 10, wherein the substantially collimated beam has an output power level of less than 450 mW.

20. Apparatus for recording visible marks on a recording medium using an input beam generated by an electromagnetic radiation source, comprising:
  (a) collimating means for substantially collimating the input beam to provide a substantially collimated beam; and
  (b) recording means associated with the collimating means for applying the substantially collimated beam to the recording medium to provide the visible mark on the recording medium.

21. The apparatus of claim 20, wherein the collimating means comprises means for substantially collimating an electromagnetic radiation beam from the electromagnetic radiation source to provide a preliminary substantially collimated beam, and means for converging the preliminary substantially collimated beam to provide the input beam.

22. The apparatus of claim 20, wherein the collimating means is a lens having an exit pupil with a numeric aperture of 0.04 or less.

23. The apparatus of claim 20, wherein the collimating means is a lens having an entrance pupil with a numeric aperture of 0.1 or greater.

24. The apparatus of claim 20, wherein the collimating means is a lens that has an output Rayleigh range greater than plus or minus 100 microns.

25. The apparatus of claim 20, wherein a beam waist of the substantially collimated beam is in the range of 8 to 35 microns, full width half max, photochromic manner.

26. The apparatus of claim 20, wherein the electromagnetic radiation source is a laser.

27. The apparatus of claim 20, wherein the recording medium is a DVD, HD DVD, CD or Blu-Ray optical disc.

28. The apparatus of claim 20, wherein the output power of the substantially collimated beam is less than 450 mW.

29. Apparatus for recording an image on a recording medium using an input beam coupled to the electromagnetic radiation source to produce a visible mark on the recording medium, comprising:
  (a) an input lens configured to couple to the input beam, the input lens having an entrance numeric aperture of 0.1 or more;
  (b) an output lens configured to substantially collimate the input beam, the output lens having an exit numeric aperture of 0.04 or less to provide a substantially collimated beam; and
  (c) a recording device configured to apply the substantially collimated beam to the recording medium to produce the visible mark on the recording medium.

30. The apparatus of claim 29, wherein the input lens is integral with the output lens.

31. The apparatus of claim 29, further comprising a preliminary collimating lens configured to substantially collimate an electromagnetic radiation beam from the electromagnetic source to provide a preliminary substantially collimated beam, and a converging lens configured to converge the preliminary substantially collimated beam to provide the input beam.

32. The apparatus of claim 29, wherein the input lens, output lens and recording device are part of a thermochronic system.

33. The apparatus of claim 29, wherein the recording device is adapted to record the visible mark on a label region of an optical disc different from a data region of the optical disc.

34. The apparatus of claim 29, wherein the electromagnetic radiation source is a laser.

35. A program storage system readable by a computer, tangibly embodying a program, applet or instructions executable by the computer to cause a laser marking system to utilize an input beam from a laser to perform a method for making a visual mark on a recording medium, comprising:
  (a) substantially collimating the input beam to provide a substantially collimated beam; and
  (b) applying the substantially collimated beam to the recording medium to provide the visible mark on the recording medium.

36. The program storage system of claim 35, wherein the substantially collimating the input beam comprises substantially collimating an electromagnetic radiation beam from the electromagnetic radiation source to provide a preliminary substantially collimated beam, and converging the preliminary substantially collimated beam to provide the input beam.

37. The program storage system of claim 35, wherein the image is recorded on a side of an optical disc opposite to a data side of the optical disc.

38. The program storage system of claim 35, wherein the input beam is generated by a laser.

* * * * *

UNITED STATES PATENT AND TRADEMARK OFFICE
CERTIFICATE OF CORRECTION

PATENT NO. : 7,729,216 B2
APPLICATION NO. : 11/174700
DATED : June 1, 2010
INVENTOR(S) : Andrew L. Van Brocklin et al.

Page 1 of 1

It is certified that error appears in the above-identified patent and that said Letters Patent is hereby corrected as shown below:

In column 7, line 4, after "typical" insert -- ½ --.

In column 10, line 32, in Claim 32, delete "thermochronic" and insert -- thermochromic --, therefor.

Signed and Sealed this

Seventeenth Day of May, 2011

David J. Kappos
*Director of the United States Patent and Trademark Office*